US010211907B1

(12) United States Patent
Oroskar et al.

(10) Patent No.: US 10,211,907 B1
(45) Date of Patent: *Feb. 19, 2019

(54) COORDINATED MULTIPOINT MODE SELECTION FOR RELAY BASE STATION

(71) Applicant: Sprint Spectrum L.P., Overland Park, KS (US)

(72) Inventors: Siddharth S. Oroskar, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 59 days.

This patent is subject to a terminal disclaimer.

(21) Appl. No.: 15/165,981

(22) Filed: May 26, 2016

(51) Int. Cl.
| H04B 7/155 | (2006.01) |
| H04W 72/04 | (2009.01) |
| H04B 7/024 | (2017.01) |
| H04L 12/26 | (2006.01) |

(52) U.S. Cl.
CPC ............. *H04B 7/155* (2013.01); *H04B 7/024* (2013.01); *H04L 43/16* (2013.01); *H04W 72/0413* (2013.01); *H04W 72/0486* (2013.01)

(58) Field of Classification Search
CPC ........ H04B 7/204; H04B 7/155; H04B 7/024; H04L 43/16
See application file for complete search history.

(56) References Cited

U.S. PATENT DOCUMENTS

| 8,121,052 | B2 | 2/2012 | Zheng et al. |
| 8,565,688 | B2 | 10/2013 | Li et al. |
| 8,599,740 | B2 | 12/2013 | Cai et al. |
| 8,743,829 | B2 | 6/2014 | Guan et al. |
| 8,831,612 | B2 | 9/2014 | Kim et al. |
| 9,143,222 | B2 | 9/2015 | Miyata |

(Continued)

FOREIGN PATENT DOCUMENTS

| CN | 102036325 | 4/2011 |
| EP | 2 385 653 A2 | 11/2011 |

(Continued)

OTHER PUBLICATIONS

Irmer et al., "Coordinated Multipoint: Concepts, Performance, and Field Trial Results", IEEE Communications Magazine, 2011, 102-111.

(Continued)

*Primary Examiner* — Hassan Kizou
*Assistant Examiner* — Deepa Belur

(57) ABSTRACT

Disclosed herein are methods and systems for selection of a coordinated multipoint (CoMP) mode for a relay base station, based on traffic load being experienced between the relay WCD and donor base station that provide the relay tunnel used by the relay base station for backhaul communication. An exemplary method involves the relay base station: (i) determining a load indication for a communication link between a relay wireless communication device (WCD) and a donor base station, (ii) using the load indication for the communication interface between the relay WCD and the donor base station as a basis for selecting a CoMP mode from a plurality of available CoMP modes; and (iii) providing wireless service in at least one coverage area according to the selected CoMP mode.

17 Claims, 8 Drawing Sheets

(56) References Cited

U.S. PATENT DOCUMENTS

| | | | |
|---|---|---|---|
| 9,143,972 B2 | 9/2015 | Tao et al. | |
| 9,173,152 B2 | 10/2015 | Kim et al. | |
| 9,198,059 B2 | 11/2015 | Miyata | |
| 9,271,249 B2 | 2/2016 | Davydov et al. | |
| 9,344,918 B2 | 5/2016 | Yamazaki | |
| 9,413,435 B1* | 8/2016 | Oroskar | H04B 7/0689 |
| 9,420,501 B2 | 8/2016 | Lei et al. | |
| 9,554,375 B1* | 1/2017 | Srinivas | H04L 5/0035 |
| 9,693,304 B2 | 6/2017 | Davydov et al. | |
| 2003/0161328 A1 | 8/2003 | Chase et al. | |
| 2008/0253319 A1 | 10/2008 | Ji et al. | |
| 2011/0294509 A1 | 12/2011 | Kim et al. | |
| 2012/0002643 A1* | 1/2012 | Chung | H04J 11/0093 370/331 |
| 2012/0088455 A1 | 4/2012 | Love et al. | |
| 2012/0182972 A1 | 7/2012 | Guan et al. | |
| 2012/0184322 A1* | 7/2012 | Falconetti | H04W 28/18 455/524 |
| 2012/0282942 A1 | 11/2012 | Uusitalo et al. | |
| 2012/0307639 A1* | 12/2012 | Zirwas | H04W 28/08 370/236 |
| 2012/0329401 A1* | 12/2012 | Wegmann | H04L 41/0803 455/67.11 |
| 2013/0017825 A1 | 1/2013 | Li et al. | |
| 2013/0021929 A1* | 1/2013 | Kim | H04B 7/024 370/252 |
| 2013/0083783 A1 | 4/2013 | Gupta et al. | |
| 2013/0114517 A1 | 5/2013 | Blankenship et al. | |
| 2013/0201914 A1* | 8/2013 | Wang | H04W 24/10 370/328 |
| 2013/0244709 A1 | 9/2013 | Davydov et al. | |
| 2013/0288731 A1 | 10/2013 | Chu | |
| 2013/0310098 A1* | 11/2013 | Baligh | H04L 5/0032 455/509 |
| 2013/0343273 A1 | 12/2013 | Barbieri et al. | |
| 2014/0056237 A1 | 2/2014 | Eriksson et al. | |
| 2014/0185523 A1 | 7/2014 | Davydov et al. | |
| 2014/0226575 A1 | 8/2014 | Davydov et al. | |
| 2014/0274197 A1 | 9/2014 | Miyata | |
| 2014/0295826 A1* | 10/2014 | Choi | H04W 28/0215 455/426.1 |
| 2014/0321359 A1* | 10/2014 | Seo | H04L 5/0057 370/328 |
| 2014/0370902 A1 | 12/2014 | Kim et al. | |
| 2015/0009931 A1 | 1/2015 | Yamazaki | |
| 2015/0011158 A1* | 1/2015 | Luo | H04W 16/26 455/11.1 |
| 2015/0049626 A1 | 2/2015 | Chen et al. | |
| 2015/0141015 A1 | 5/2015 | Zhang et al. | |
| 2015/0195032 A1* | 7/2015 | Sharma | H04B 7/15557 370/315 |
| 2015/0270877 A1 | 9/2015 | Hessler et al. | |
| 2015/0312811 A1 | 10/2015 | Lei et al. | |
| 2015/0341149 A1 | 11/2015 | Chatterjee et al. | |
| 2016/0157156 A1 | 6/2016 | Chen et al. | |
| 2016/0174111 A1 | 6/2016 | Zhu et al. | |
| 2017/0048763 A1 | 2/2017 | Ke et al. | |
| 2017/0048913 A1 | 2/2017 | Teyeb et al. | |
| 2017/0134996 A1 | 5/2017 | Wang et al. | |
| 2017/0230868 A1* | 8/2017 | Matsuo | H04W 28/16 |
| 2017/0237535 A1* | 8/2017 | Park | H04L 5/0035 370/329 |
| 2017/0272219 A1* | 9/2017 | Park | H04L 5/0035 |
| 2018/0070276 A1 | 3/2018 | Wu | |
| 2018/0084464 A1 | 3/2018 | Ozturk et al. | |
| 2018/0139017 A1* | 5/2018 | Chen | H04L 5/0035 |

FOREIGN PATENT DOCUMENTS

| | | |
|---|---|---|
| EP | 2485529 | 11/2013 |
| ES | 2443872 T3 | 2/2012 |
| WO | 13/138779 A1 | 9/2013 |
| WO | 14/062104 A1 | 4/2014 |
| WO | 2014/182714 | 11/2014 |
| WO | 2014/183617 | 11/2014 |
| WO | 2017/171900 | 10/2017 |

OTHER PUBLICATIONS

The 3G4G Blog: Coordinated Multi-Point (CoMP) transmission and reception, 2010, 14 pages, printed Feb. 26, 2015, http://blog.3g4g.co.uk/2010/02/coordinated-multi-point-comp.html.

Mahalingam, "Coordinated Multipoint Tx and Rx", White Paper Radisys, Radisys Corporation, 2011, 7 pages.

Ghaleb et al., "QoS-Aware Joint Uplink-Downlink Scheduling in FDD LTE-Advanced with Carrier Aggregation", IEEE, 2014, pp. 111-115.

U.S. Appl. No. 14/531,628, filed Nov. 3, 2014.

"Carrier Aggregation—Activation and Deactivation of Secondary Calls," How LTE Stuff Works?, printed from the World Wide Web, dated Oct. 17, 2014.

Co-Pending U.S. Appl. No. 14/447,604, filed Jul. 30, 2014.
Co-Pending U.S. Appl. No. 14/543,465, filed Nov. 17, 2014.
Co-Pending U.S. Appl. No. 14/575,428, filed Dec. 18, 2014.
Co-Pending U.S. Appl. No. 14/575,455, filed Dec. 18, 2014.

Hsu et al., "Dynamic Cooperating Set Planning for Coordinated Multi-Point (CoMP) in LTE/LTE-Advanced Systems," 2013 15th Asia-Pacific Network Operations and Management Symposium (APNOMS), Hiroshima, Japan, 2013, pp. 1-6.

Radio-Electronics.com, "4G LTE CoMP, Coordinated Multipoint Tutorial," <http://www.radio-electronics.com/info/cellulartelecomms/lte-long-term-evolution/4g-lte-advanced-comp-coordinated-multipoint.php>, 6 pages.

Rohde & Schwarz, "LTE-Advanced (3GPP Rel. 11) Technology Introduction, White Paper," Jul. 2013, 39 pages.

* cited by examiner

COORDINATED MULTIPOINT MODE SELECTION FOR RELAY BASE STATION

BACKGROUND

Many people use mobile stations, such as cell phones, personal digital assistants (PDAs), tablet computers, laptop computers, desktop computers, in-car computers, and so on, to communicate with cellular wireless networks. These WCDs and networks typically communicate with each other over a radio frequency (RF) air interface according to a wireless communication protocol such as Code Division Multiple Access (CDMA), perhaps in conformance with one or more industry specifications such as IS-95 and IS-2000. Wireless networks that operate according to these specifications are often referred to as "1×RTT networks" (or "1× networks" for short), which stands for "Single Carrier Radio Transmission Technology." These networks typically provide communication services such as voice, Short Message Service (SMS) messaging, and packet-data communication.

Mobile stations typically conduct these wireless communications with one or more base transceiver stations (BTSs), each of which send communications to and receive communications from mobile stations over the air interface. Each BTS is in turn communicatively connected with an entity known as a base station controller (BSC), which (a) controls one or more BTSs and (b) acts as a conduit between the BTS(s) and one or more switches or gateways, such as a mobile switching center (MSC) and/or packet data serving node (PDSN), which may in turn interface with one or more signaling and/or transport networks.

As such, mobile stations can typically communicate with one or more endpoints over the one or more signaling and/or transport networks from inside one or more coverage areas (such as cells and/or sectors) of one or more BTSs, via the BTS(s), a BSC, and an MSC and/or PDSN. In typical arrangements, MSCs interface with the public switched telephone network (PSTN), while PDSNs interface with one or more core packet-data networks and/or the Internet.

To meet increasing demand for high-speed data on mobile devices, cellular service providers have begun implementing "4G" networks, which provide service under one or more 4G air interface protocols, such a long-term evolution (LTE) protocol. LTE was developed by the $3^{rd}$ Generation Partnership Project (3GPP), and is based on GSM/EDGE and UMTS/HSPA network technology.

In the context of LTE, a mobile station is typically referred to as a "user entity" (UE), and may take various mobile and stationary forms, such as a mobile phone, tablet computer, laptop computer, desktop computer, or any other device configured for wireless communication. Herein, the terms "mobile station," "wireless communication device" (or WCD), and "user entity" (or UE) may be used interchangeably.

Optimally, a wireless service provider will strategically implement base stations throughout a market area so that served WCDs can move between the base station coverage areas without loss of coverage. Each base station may include an antenna structure and associated equipment, and the wireless service provider may connect the base station by a landline cable (e.g., a T1 line) with the service provider's network infrastructure to enable the base station to communicate with a signaling controller (e.g., MME), gateway system, other base stations, and the like.

In practice, however, it may be impractical for a wireless service provider to run landline connections to base stations in certain locations. For instance, where a service provider seeks to provide many small coverage areas blanketing a market area or to fill in coverage holes between coverage of other base stations, the service provider may implement many small-cell base stations throughout the market area, but it may be inefficient or undesirable to run landline cables to every one of those small-cell base stations.

To connect a base station with the network infrastructure in such a situation, the wireless service provider may implement a wireless backhaul connection between the base station and another base station of the service provider's network. In this situation, the base station at issue operates as a relay base station, and the other base station operates as a donor base station. Note that a relay base station may also be referred to as a "mini-macro" (MM) base station.

In practice, the relay base station includes or is coupled (e.g., via a local area network or other connection) with a WCD, referred to as a relay WCD, and the donor base station then serves the relay WCD in much the same way that the donor base station serves other WCDs. Further, the relay base station itself serves WCDs, in much the same way that any base station would.

With this arrangement, when the relay WCD attaches with the donor base station, the relay WCD may acquire connectivity and an IP address as discussed above for instance. But based on a profile record for the relay WCD, the network (e.g., a signaling controller) may recognize that the relay WCD is a relay WCD (rather than a normal end-user WCD) and may therefore set up a bearer connection for that relay WCD with a special core network gateway system (e.g., "SAE GW") that provides for internal core network connectivity and assigns the relay WCD with an IP address for use to communicate within the core network. Once the relay WCD receives that core network IP address assignment, the relay WCD may then convey that IP address to the relay base station for use by the relay base station as the relay base station's IP address on the core network. The relay base station may then operate as a full-fledged base station of the network, having IP-based interfaces with other core network entities (e.g., a signaling controller, a gateway system, and other base stations), albeit with those interfaces passing via the wireless backhaul connection provided by the relay WCD, and via the core network gateway system.

Once the relay base station is thus in operation, the relay base station may then serve WCDs in the same way as a standard base station serves WCDs. Thus, when a WCD enters into coverage of the relay base station, the WCD may signal to the relay base station to initiate an attach process, the WCD may acquire an IP address, and an MME may engage in signaling to establish one or more bearers between the WCD and a gateway system. Each of these bearers, though, like the relay base station's signaling communication, would pass via the relay's wireless backhaul connection.

In a further aspect of some protocols, such as LTE, reception at cell edges may be problematic for various reasons. For example, the greater distance to a base station at a cell edge may result in lower signal strength. Further, at a cell edge, interference levels from neighboring cells are likely to be higher, as the wireless communication device is generally closer to neighboring cells when at a cell edge.

In an effort to improve the quality of service at cell edges, 3GPP LTE-A Release 11 introduced a number of Coordinated Multipoint (CoMP) schemes. By implementing such CoMP schemes, a group or cluster of base stations may improve service at cell edges by coordinating transmission and/or reception in an effort to avoid inter-cell interference, and in some cases, to convert inter-cell interference into a usable signal that actually improves the quality of service that is provided.

LTE-A Release 11 defined a number of different CoMP schemes or modes for both the uplink (UL) and the downlink (DL). For the downlink, two basic types of CoMP modes are set forth: joint processing (JP) schemes and coordinated scheduling/beamforming (CSCH or DL-CSCH) schemes. For the uplink, numerous types of CoMP modes have been devised.

Uplink CoMP modes may involve interference rejection combining (IRC) or coordinated scheduling for purposes of reducing or preventing interference between transmissions from different user entities (UEs). Additionally or alternatively, various uplink CoMP modes may involve "joint reception" and/or "joint processing." Joint reception generally involves multiple base stations receiving an uplink signal that is transmitted by a given UE. Joint processing generally involves the multiple base stations that received the uplink signal from the UE, sending the respectively received signals or a decoded and/or processed version of the respectively received signals to one another, or just to a master base station in the group, such that the multiple received versions of the UE's transmission can be combined to improve reception and/or reduce interference.

Various types of joint processing have been implemented on the uplink. For example, joint processing on the uplink can be centralized. When a centralized CoMP mode is implemented on the uplink, the coordinating base stations may simply pass the entire received signal from a given UE on to a master base station, which then uses the received signals from multiple base stations to decode and/or process the signal from the given UE. Joint processing on the uplink can also be de-centralized to varying degrees. Specifically, when a decentralized CoMP mode is implemented on the uplink, a coordinating base station may decode and/or process the received signal from a given UE, and then send the decoded and/or processed signal from the given UE to the master base station. The master base station can then combine or select from the decoded and/or processed versions of the UE's transmission, which are sent to the master base station from one or more coordinating base stations that receive the UE's signal (and possibly a version of the UE's signal that is received at the master base station itself).

Overview

Coordinated multipoint (CoMP) service can improve the throughput at cell edges, and can also improve overall network efficiency. However, CoMP service can also increase the load on backhaul links between base stations and/or other core network entities. The increase in backhaul communications associated with CoMP service can be of particular significance for relay base stations (e.g., MMs), which rely on the radio link between the relay wireless communication device (WCD) and the donor base station for backhaul communications instead of a dedicated backhaul link. Accordingly, methods and systems are disclosed herein for selecting a CoMP mode for a relay base station, based on the load on the link between its relay WCD and donor base station. Provided with such methods and systems a relay base station can dynamically adjust the CoMP mode it utilizes in response to load variations on the link between its relay WCD and donor base station.

In one aspect, an exemplary method may be implemented by a relay base station. The method involves the relay base station: (i) determining a load indication for a communication interface between a relay WCD and a donor base station, wherein the relay base station is provided with a backhaul connection via the relay WCD and the donor base station; (ii) using the load indication for the communication interface between the relay WCD and the donor base station as a basis for selecting a CoMP mode from a plurality of available CoMP modes; and (iii) providing, by the relay base station, wireless service in at least one coverage area according to the selected CoMP mode.

In another aspect, an exemplary base-station system includes a communication interface operable for wireless communication with a WCD, an antenna operable to provide wireless service in at least one coverage area, at least one processor, and program instructions stored on a non-transitory computer readable medium. The program instructions are executable by the at least one processor to perform functions including: (a) causing a base station to operate as a relay base station via a connection to the WCD and a donor base station serving the WCD, wherein the WCD serves as a relay WCD for the relay base station; (b) determining a load indication for a communication link between the relay WCD and the donor base station, wherein the relay base station is provided with a backhaul connection via the relay WCD and the donor base station; (c) using the load indication for the communication link between the relay WCD and the donor base station as a basis for selecting a CoMP mode from a plurality of available CoMP modes; and (d) providing wireless service in at least one coverage area according to the selected CoMP mode.

In a further aspect, another exemplary method may be carried out by a WCD that is serving as a relay WCD for a relay base station. The method involves the relay WCD: (i) determining a load indication for a communication link between the relay WCD and a donor base station, wherein a relay base station is provided with a backhaul connection via the relay WCD and the donor base station; (ii) using the load indication for the communication link between the relay WCD and the donor base station as a basis for selecting a CoMP mode from a plurality of available CoMP modes; and (iii) sending a CoMP-mode message that indicates the selected CoMP mode to the relay base station.

These as well as other aspects, advantages, and alternatives, will become apparent to those of ordinary skill in the art by reading the following detailed description, with reference where appropriate to the accompanying drawing

BRIEF DESCRIPTION OF THE DRAWINGS

An exemplary embodiment of the present invention is described herein with reference to the drawings, in which.

DETAILED DESCRIPTION

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

I. ILLUSTRATIVE NETWORK AND RELAY BASE STATION CONFIGURATION

Figure 1A:
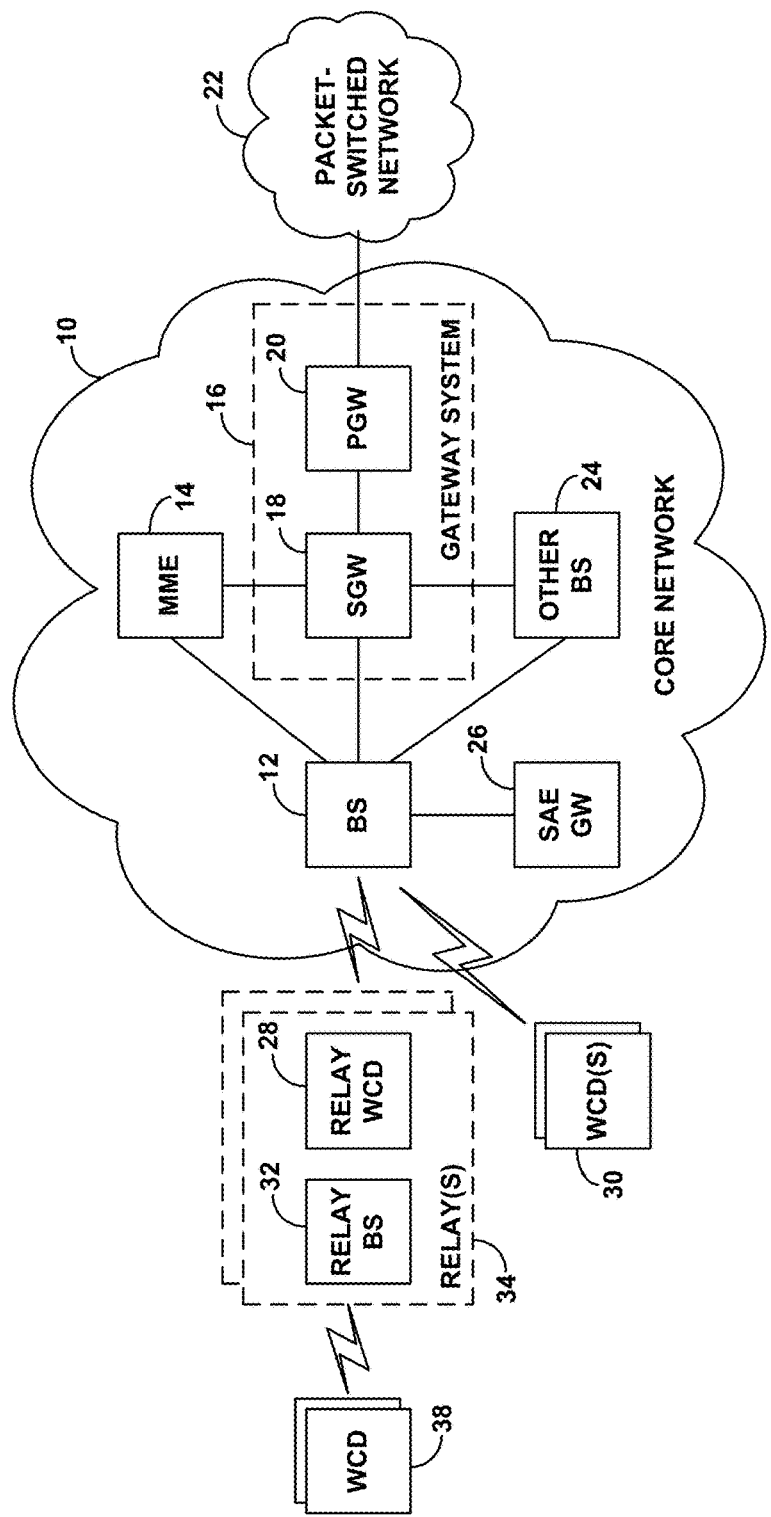
FIG. 1A is a simplified block diagram of a wireless communication system in which the present method and system can be implemented.

Referring to the drawings, FIG. 1A is a simplified block diagram of a wireless communication system in which the present method and system can be implemented. In particular, FIG. 1 depicts a representative LTE core network 10, which functions primarily to serve WCDs with wireless packet data communication service, including possibly voice-over-packet service, but may also provide other functions. The core network 10 may be a packet-switched network, compliant with the industry standard system architecture evolution (SAE) for the LTE protocol.

As shown, network 10 includes an example base station (BS) 12, which is also referred to as eNodeB 12. Base station 12 has an antenna structure and associated equipment (not shown) for providing LTE coverage in which to serve the WCDs. The base station 12 then has communication interfaces with an example MME 14, functioning as a signaling controller for the network 10. Further, the base station 12 has a communication interface with a gateway system 16, which includes a serving gateway (SGW) 18 and a packet-data-network gateway (PGW) 20, the PGW provides connectivity with a packet-switched transport network 22 such as the Internet, and the MME 14 has a respective communication interface with the SGW 18 as well. In addition, the base station 12 has a communication interface, such as an industry standard X2 interface, with another base station 24.

As further shown, network 10 then also includes, and base station 12 has an interface with, a core network gateway depicted as an "SAE GW" 26, which serves to provide connectivity within the network 10, for a relay WCD and relay base station as noted above for instance.

FIG. 1A also shows a plurality of WCDs within coverage area(s) of base station 12, including at least one relay WCD 28 and at least one non-relay WCD 30. Each non-relay WCD 30 may be an end-user WCD such as one of the types of WCDs noted above (e.g., cell phone, tablet computer, tracking device, etc.) that is not set to provide wireless backhaul connectivity for a relay base station. Whereas, each relay WCD 28 may be a WCD that is set to provide wireless backhaul connectivity for a relay base station 32. As such, a relay WCD could be a conventional WCD (e.g., cell phone or the like) that is locally coupled with a relay base station (e.g., via a local area network or direct cable or wireless connection) and that is configured to operate as a relay WCD for the relay base station, or the relay WCD could be a WCD module that is incorporated within a base station, thereby allowing the base station to obtain wireless backhaul connectivity and thus function as a relay base station.

Relay WCD 28 and relay base station 32 cooperatively define a relay 34. As such, base station 12 serves as a donor base station for relay 34 and as a conventional base station for each non-relay WCD 30, relay 34 has a wireless backhaul connection 36 with the donor base station 12, and relay 34 then provides its own wireless coverage for serving one or more other WCDs 38.

In practice, each of these WCDs may be configured within the network 10 as a device to be served by the network (such as an authorized subscriber device), and a mechanism may be provided to distinguish relay WCDs from conventional WCDs, so as to facilitate treating relay WCDs differently than conventional WCDs. By way of example, a relay WCD may have a special identifier or operate and be served by the network under a special network identifier (e.g., a special public land mobile network (PLMN) identifier, or special packet data network (PDN) connection identifier), indicating that the relay WCD will be operating as a relay WCD. Whereas a conventional WCD may have an identifier or be served by the network under an identifier that does not indicate the WCD will be operating as a relay WCD and thus that may establish the WCD is not a relay WCD. Accordingly, when a WCD attaches with the network, such as with base station 12, the network (e.g., the base station, MME, and/or other network entity) may determine whether the WCD is a relay WCD (i.e., whether the WCD provides wireless backhaul connectivity for a relay base station) or not, based on such identification or other information provided by the WCD during attachment or noted in a network profile record for the WCD.

In an LTE network such as this, when base station 12 is put in service, the base station 12 may acquire an IP address for use within the network 10. Further, the base station 12 may then engage in signaling ((stream control transmission protocol (SCTP) signaling) with MME 14 to establish an S1-AP connection (S1-AP interface) with the MME. To facilitate this, the base station 12 may be pre-provisioned with data specifying the IP address of the MME so that the base station 12 can engage in signaling with the MME to set up such a connection. This S1-AP connection with the MME then serves as a signaling channel between the base station 12 and the MME.

When a WCD (such as WCD 28 or WCD 30) initiates attachment with base station 12, base station 12 may then signal to the MME to trigger establishment for the WCD of an S1-MME connection (S1-MME interface) between the base station 12 and the MME. Further, this signaling also causes the MME to engage in signaling to establish some other connections for the WCD, which may vary based on whether the WCD is a conventional WCD or rather a relay WCD (e.g., as indicated by the WCD's PLMN identifier or other data). If the WCD is a conventional WCD, then the MME may engage in signaling with the base station 12 and SGW 18 to establish for the WCD an S1-U connection (S1-U interface) between the base station 12 and the SGW 18 and an S5 connection (S5 interface) between the SGW 18 and the PGW 20, and PGW 20 may assign to the WCD an IP address for use on external packet-switched network 22. Whereas, if the WCD is a relay WCD, then the MME may engage in signaling with the base station 12 and SAE GW 26 to establish for the WCD an S1-U connection between the base station 12 and the SAE GW 26 and, internally within the SAE GW 26, an S5 connection, and the SAE GW 26 may assign to the WCD an IP address for use internally within the core network 10.

In line with the discussion above, once relay WCD 28 acquires connectivity with donor base station 12 and receives an IP address assignment, the relay WCD 28 may then provide that IP address to its relay base station 32, so that the relay base station 32 can use that IP address as its own address for communicating with other entities in the core network 10. The relay WCD 28 and relay base station 32 may each be programmed with processor logic to facilitate this. Once the relay base station 32 thus has an IP address on the core network, communications that the relay base station 32 has in the core network 10 will pass via a tunnel through (i) the relay WCD 28, (ii) the radio link between the relay WCD 28 and the donor base station 12, and (iii) the SAE GW 26.

When the relay base station 32 thus acquires an IP address in the core network 10, the relay base station 32, like base station 12 on the core network, will form an S1-AP connection with an MME (which could be the same or different than that used by base station 12). To facilitate this, the relay base station 32 may be pre-provisioned with data specifying the IP address of the MME so that the relay base station 32 can engage in signaling with the MME to set up such a connection, via the SAE GW 26. This S1-AP connection with the MME then serves as a signaling channel between the relay base station 32 and the MME.

Further, when a WCD 38 initiates attachment with relay base station 32, relay base station 32 may then signal to the MME to trigger establishment for the WCD 38 of an S1-MME connection between the relay base station 32 and the selected MME, an S1-UE connection between the relay base station 32 and the SGW 18, and an S5 connection between the SGW 18 and the PGW 20, with PGW 20 assigning to WCD 38 an IP address for use on external packet-switched network 22, again with all of these connections possibly passing via the SAE GW.

II. COORDINATED MULTIPOINT

As noted above, a network such as LTE network 10 may implement various types of coordinated multipoint (CoMP) schemes, which provide various techniques by which base stations may coordinate with one another to improve uplink and/or downlink service. Note that CoMP schemes designed for coordinated transmission by base stations may be referred to as downlink CoMP modes, while CoMP schemes designed for coordinated reception may be referred to as uplink CoMP modes.

Figure 1B:
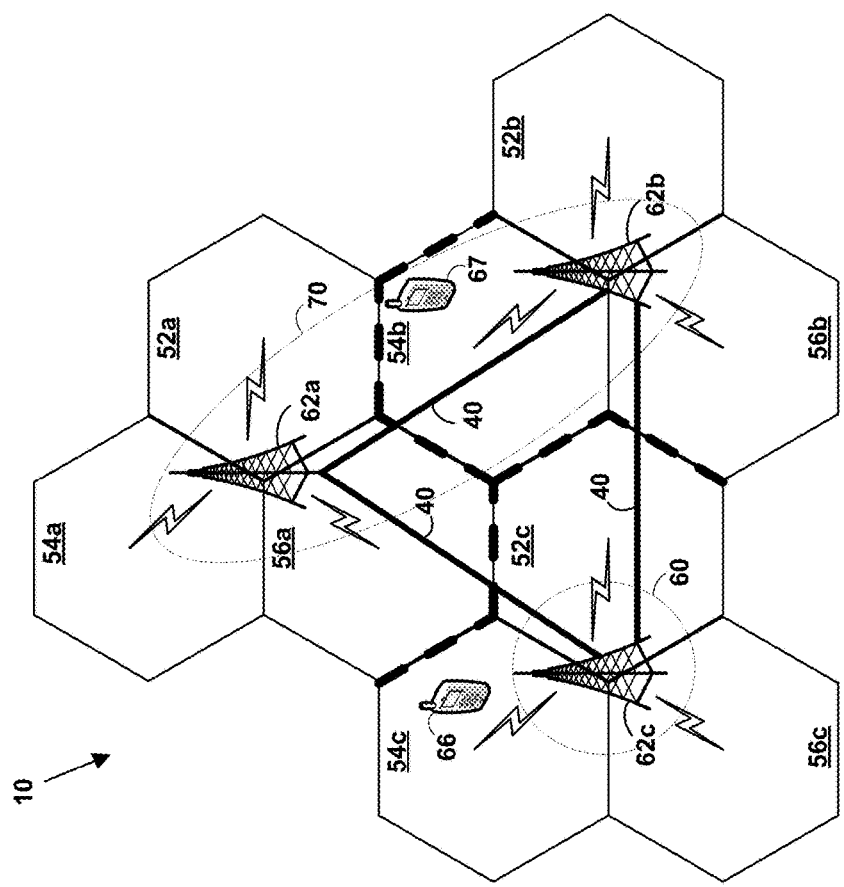
FIG. 1B is a simplified block diagram illustrating a portion of communication network in which CoMP schemes may be implemented for uplink and/or downlink communication.

FIG. 1B is a simplified block diagram illustrating a portion of communication network 10 in which CoMP schemes may be implemented for uplink and/or downlink communications. In particular, FIG. 1B shows a portion of an LTE network, which includes three eNodeBs 62a to 62c. More or less eNodeBs, and/or other types of access points or base transceiver stations, are also possible. As shown, eNodeB 62a is serving three coverage areas or sectors 52a, 54a, and 56a, eNodeB 62b is serving three coverage areas or sectors 52b, 54b, and 56b, and eNodeB 62c is serving three coverage areas or sectors 52c, 54c, and 56c. Further, a UE 66 is operating in sector 54c, which is served by eNodeB 62c. Further, while not shown in FIG. 1B, each eNodeB 62a to 62c may be configured in the same or in a similar manner as the eNodeB 12 shown in FIG. 1A. For instance, each eNodeB 62a to 62c may be communicatively coupled to an MME and/or an SGW. Further, note that some or all of eNodeBs 62a to 62c may be communicatively coupled to the same MME and/or the same SGW. Alternatively, each eNodeB 62a to 62c might be connected to a different MME and/or different SGW.

In some cases, uplink CoMP may be implemented by a single base station, which provides service in multiple sectors. This type of CoMP scheme may be referred to as an "intra base station" or "intra-eNodeB" CoMP scheme. For example, eNodeB 62c may provide uplink CoMP by utilizing and/or combining uplink signals from a UE that are received at two or more of the sectors 52c, 54c, and 56c that are served by eNodeB 62c. In particular, eNodeB 62c may define a CoMP group 60 to include all its sectors 52c, 54c, and 56c. As such, eNodeB 62c may adaptively use joint processing techniques and/or interference rejection combining (IRC) techniques when the uplink signal from UE 66 is received at two or more of the sectors 52c, 54c, and 56c that it serves.

In other cases, uplink CoMP may be implemented by multiple base stations, which may each provide service in multiple sectors or only in one cell. This type of CoMP scheme may be referred to as an "inter base station" or "inter-eNodeB" CoMP scheme. For example, eNodeBs 62a and 62c may provide uplink CoMP by utilizing and/or combining uplink signals from UE 77 that are received at two or more of the sectors 52a, 54a, 56a, 52b, 54b, and 56b that are served by eNodeBs 62a and 62b. (Those skilled in the art will understand that in the context of CoMP the "uplink signals" received at different base stations result from the same uplink signal that is transmitted by the UE, but are different because the transmission is "perceived" differently in the different sectors.)

Figure 2:
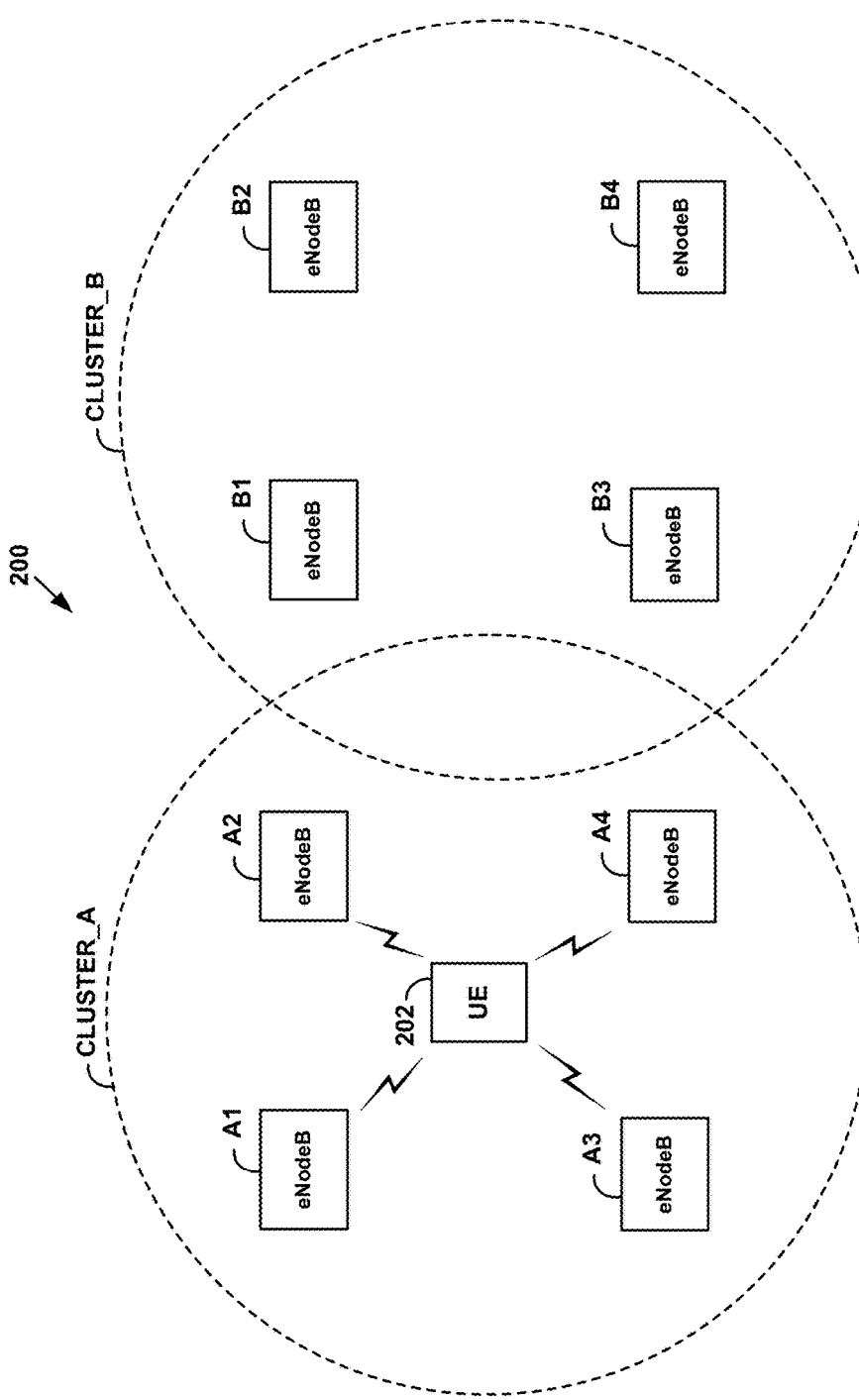
FIG. 2 is a simplified block diagram illustrating a portion of an LTE network in which inter-eNodeB CoMP service may be implemented.

FIG. 2 is a simplified block diagram illustrating a portion of an LTE network in which inter-eNodeB CoMP service may be implemented. In particular, FIG. 2 shows a portion of an LTE network 200, which includes eNodeBs A1 to A4 and eNodeBs B1 to B4. Further, a UE 202 is operating in the illustrated portion of the LTE network.

When uplink CoMP involves multiple base stations (e.g., as in inter-base station CoMP), the base stations may coordinate with one another via a backhaul network, which allows for communications between base stations and/or other network components. For example, in an LTE network, eNodeBs may communicate via links that are referred to as X2 interfaces. X2 is described generally in Technical Specification ETSI TS 136 420 for LTE; Evolved Universal Terrestrial Radio Access Network (E-UTRAN); X2 general aspects and principles. In FIG. 1B, eNodeBs 62a to 62c are communicatively connected via X2 links 40. It should be understood, however, that other types of backhaul communications are also possible. Similarly, while X2 links are not shown in FIG. 2, eNodeBs A1 to A4 and eNodeBs B1 to B4 may be interconnected via X2 links or another type of backhaul link.

In a further aspect, when a relay base station participates in CoMP service, a typical X2 link between the relay base station and other base station(s) in the network is not available. As such, a relay base station will typically use the tunnel through the relay WCD and the donor base station to its SAE GW for the relay base station's backhaul communications. As such, backhaul communications to and from a relay base station may affect the load on both the radio link between the relay base station and the relay WCD and the radio link between the relay WCD and the donor base station.

In both intra-eNodeB and inter-eNodeB CoMP, there may be pre-defined groups of sectors, which may be referred to herein as "CoMP groups" or "CoMP clusters." The eNodeB or eNodeBs that serve the sectors in a CoMP group are configured to provide uplink CoMP using some or all of the sectors in the group.

For example, in FIG. 2, base stations A1 to A4 and B1 to B4 may be grouped into clusters that can coordinate to provide various types of inter-eNodeB CoMP. In the illustrated scenario, there are two clusters: (i) cluster_A, which includes eNodeBs A1 to A4, and (ii) cluster_B, which includes eNodeBs B1 to B4. Further, in the illustrated scenario, UE 202 is being served by the eNodeBs A1 to A4 in cluster_A. Note that the clusters, such as cluster_A and cluster_B, may be predetermined and static. Alternatively, the LTE network may dynamically and intelligently update the clustering of base stations in an effort to improve service.

In a further aspect, to facilitate inter-eNodeB CoMP, a master base station may be specified for each cluster of eNodeBs. The master base station in a cluster may take the lead to coordinate various functions between the base stations in the cluster. For example, eNodeB A1 may function as the master base station (or master eNodeB) in cluster A, and eNodeB B1 may function as the master base station in cluster B. In some embodiments, the serving base station for each UE may be designated as a master base station for that UE. Other examples, in which a UE's serving base station is not designated as the master base station for that UE, are also possible. Further, the non-master base stations may be referred to herein as coordinating base stations or as neighbor base stations or eNodeBs, or as secondary base stations or eNodeBs.

In a further aspect, the coordinating eNodeB may determine which sectors and/or which eNodeBs from the CoMP group should be used to provide uplink CoMP for a given UE, at a given point in time. In particular, the coordinating eNodeB may determine a subset of the CoMP group that should be utilized for a given UE, based on various factors. Possible factors include, but are not limited to, whether or not a signal from the given UE is received in a candidate sector, signal strength and/or other air interface conditions in the candidate sector, and/or processing load at the eNodeB serving the candidate sector, among other possibilities. In the case of intra-eNodeB uplink CoMP, the process of the eNodeB selecting a subset of sectors from the sectors in its uplink CoMP group to provide uplink CoMP for a particular UE may be referred to as "adaptive sector selection."

In a further aspect, various types of uplink CoMP modes are possible. (Note that a given CoMP mode may also be referred to as a CoMP "scheme.") Further, as will be explained below, when inter-eNodeB CoMP is implemented, different uplink CoMP modes may have differing effects on: (a) the CPU load of the master base station and/or on the CPU load(s) of secondary base station(s) with which the master base station coordinates to implement uplink CoMP and/or (b) the traffic level on the backhaul network resulting from uplink CoMP.

An interference rejection combining (IRC) mode may be used to reduce or cancel interference at a receiving base station (e.g., the master eNodeB in an inter-eNodeB CoMP cluster), or in the receiving sector, in the case of intra-eNodeB CoMP. When only IRC is implemented, there is very little coordination required between the base stations an inter-eNodeB CoMP group. Therefore, in the case of inter-base-station uplink CoMP, IRC-only does not significantly increase the CPU load at a coordinating base station, nor does it significantly increase the load on the backhaul network (e.g., on X2 links between base stations).

Some uplink CoMP modes may involve joint reception, such that a UE's uplink signal is received in two or more sectors. When joint reception is implemented, multiple UEs can simultaneously transmit on the PUSCH, and may use the same RB when doing so. The PUSCHs may be received in multiple sectors, and in the case of inter-eNodeB CoMP, by multiple eNodeBs. The PUSCHs received in different sectors may be combined using various joint processing techniques, such as a mean squared error (MMSE) or zero forcing (ZF) process. Further, joint reception and joint processing may be combined with other types of uplink CoMP techniques, such as IRC, adaptive antennas, and/or multi-user detection schemes, in an effort to further improve performance and/or for other reasons.

In a further aspect, CoMP modes that include joint processing may be centralized or decentralized to varying degrees. Specifically, in the context of inter base station CoMP, the extent to which a coordinating base station decodes and/or processes a received signal, before sending to the master base station, may vary in different CoMP modes. Since different CoMP modes can increase or decrease in the amount of decoding and/or processing that is done by the coordinating base station, different CoMP modes can in turn increase or decrease the CPU load of the coordinating base station, respectively. Further, increasing the amount of decoding and/or processing that is performed by the coordinating base station may result in less data that is transferred over the backhaul network (e.g., over an X2 link) to the master base station. Specifically, less data may be transferred because, e.g., the size of the decoded signal may be less than the size of the received signal.

As an example, a first type of joint processing may involve a coordinating eNodeB sending the master eNodeB the received signal via an X2 interface, without having decoded the received signal. Specifically, coordinating eNodeB may send raw I/Q data to the master eNodeB via an X2 interface between these two eNodeBs. The raw I/Q data may include all the physical layer bits received by the eNodeB. This first type of joint processing may be referred to herein as "centralized" joint processing.

A second type of joint processing may involve a coordinating eNodeB decoding a received signal before sending it to the master eNodeB. For example, the decoding process may involve the coordinating eNodeB may extracting user data (e.g., packet data) from the physical layer bits in the received signal, such as by removing phase information represented by I/Q bits in the received signal, and/or removing other non-user data from the received signal. The master eNodeB may then compare the decoded signal received from the coordinating eNodeB to its own decoded signal (and possibly decoded signals received from other coordinating eNodeBs) and select the best decoded signal. Alternatively, the master eNodeB may combine the decoded signal from a UE that is received from a coordinating eNodeB with its own the decoded signal from the UE, and/or with one or more other versions of the decoded signal from the UE that are received from other coordinating eNodeBs, in order to generate a combined signal for the particular UE.

This second type of joint processing may be referred to herein as "decentralized" joint processing. It should be understood that varying degrees of decentralized joint processing are possible. That is, the amount of decoding and processing may vary. For example, decentralized joint processing could simply involve decoding the received signal before sending it to the master base station. However, joint processing could further involve compressing the decoded signal before sending it to the master base station (which could help to reduce the load on the backhaul links). Other examples are also possible.

As noted above, decentralized joint processing may reduce the size of the received signal before it is sent to the master base station. Therefore, while decentralized joint processing may increase the CPU load at the coordinating base stations, it can decrease the load on the backhaul link (e.g., an X2 link) between the coordinating base station and the master base station. In the case where CoMP involves a relay WCD In a further aspect, it should be understood that the above descriptions of joint processing that utilizes signals received and communicated between eNodeBs, can be classified as inter-eNodeB uplink CoMP. The same concepts may be applied in the context of intra-eNodeB joint processing, with the difference being that a single eNodeB will use uplink signals received in two or more sectors it serves for joint processing, instead of using signals sent to the eNodeB by other eNodeBs.

III. EXEMPLARY RAN COMPONENTS

Figure 3:
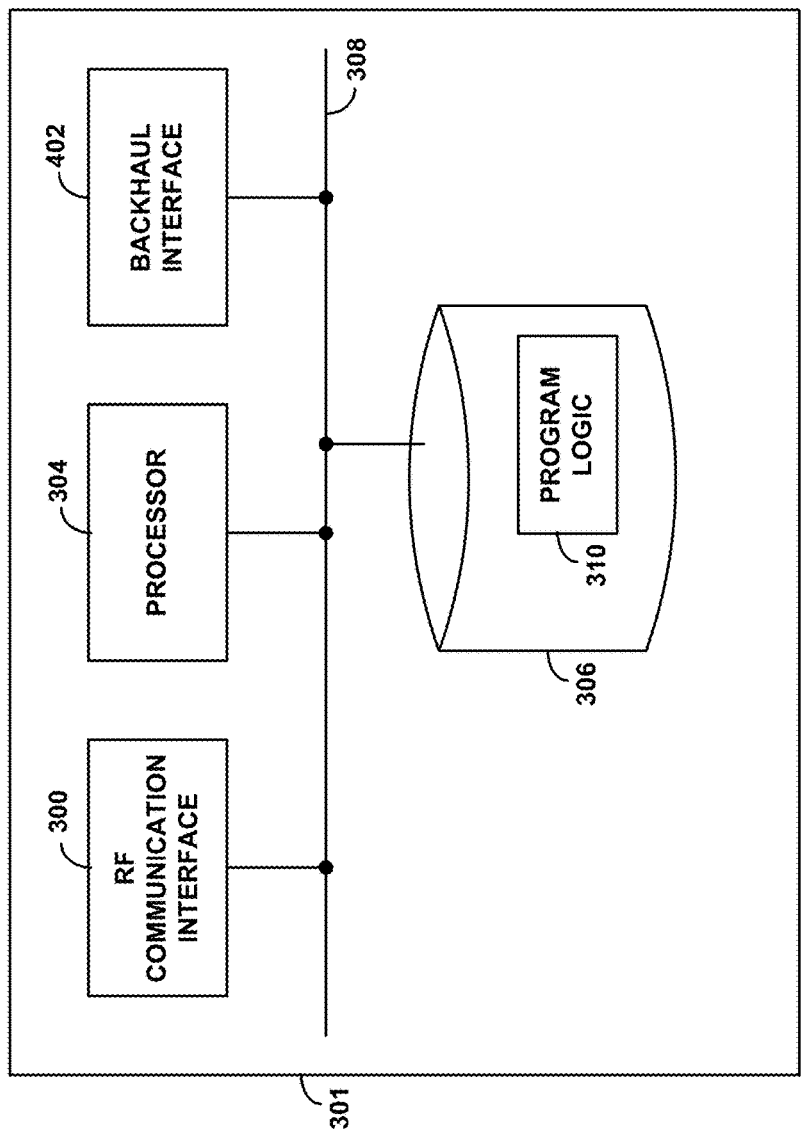
FIG. 3 is a simplified block diagram illustrating a network component, according to an exemplary embodiment.

FIG. 3 is a simplified block diagram illustrating a network component, according to an exemplary embodiment. More specifically, FIG. 3 illustrates some of the functional components that would likely be found in a network component 301 arranged to operate in accordance with the embodiments herein. As shown, the RAN component 301 may include an RF communication interface 300, a backhaul interface 302, a processor 304, and data storage 306, all of which may be communicatively linked together by a system bus, network, or one or more other connection mechanisms 308. Further, the network component 301 may be, for example, an eNodeB, a S-GW, an MME, a BTS, BSC, BTS/BSC combination, and/or an MSC, among other possibilities.

An exemplary system could be implemented as part of or within a network component 301, could take the form of such a network component itself, or might include two or more of such network components (e.g., the eNodeBs in a cluster, and possibly a S-GW and/or MME). Accordingly, the illustrated components of network component 301 (e.g., communication interface 300, a backhaul interface 302, a processor 304, and data storage 306) may be distributed and/or subdivided between two or more network components, or may be implemented in a single network component.

In network component 301, RF communication interface 300 may comprise one or more antenna structures, one or more power amplifiers, and associated equipment, for engaging in RF communication with mobile stations operating within the base station's coverage, according to one of the air-interface protocols noted above for instance. Backhaul interface 302 may comprise any sort of communication link or mechanism enabling the base station to exchange signaling and bearer data with other network entities, such as with MSC 52 for instance. Processor 304 may comprise one or more processors (e.g., general purpose and/or special purpose processors), such as microprocessors for instance.

Data storage 306 may be a non-transitory computer readable medium. For example, data storage 306 may take the form of one or more volatile and/or non-volatile storage components, such as magnetic, optical, or organic storage components, integrated in whole or in part with processor 304.

As further shown, data storage 306 contains program logic 310 (e.g., machine language instructions) executable by processor 304 to carry out various functions, such as the functionality of the exemplary methods and systems described herein. In an exemplary embodiment, data storage 306 may include program instructions that are executable by processor 304 to provide the various processes of a network and components thereof that are described herein.

Referring back to FIG. 2, eNodeBs A1 to A4 and B1 to B4 may be configured in the same or similar manner as network component 301. As such, a network component 301 may be configured as a relay base station (e.g., a relay eNodeB), which selects between use of different CoMP modes in the coverage areas that it serves based on various factors. In an exemplary embodiment, the selection may be based at least in part on the load on the communication link(s) between the relay WCD and donor base station (e.g., donor eNodeB) that provide a backhaul connection for the relay base station.

IV. EXEMPLARY METHODS

Figure 4A:
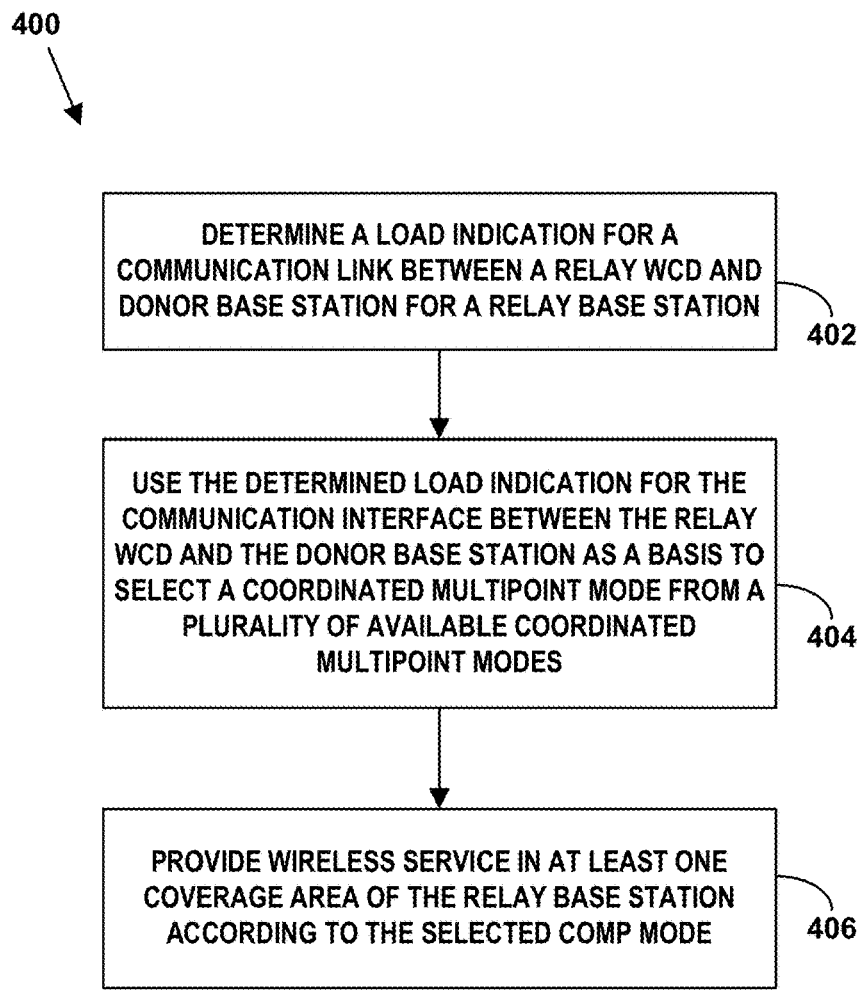
FIG. 4A is flow chart illustrating a method, according to an exemplary embodiment.

FIG. 4A is flow chart illustrating a method 400, according to an exemplary embodiment. Method 400 may be implemented by a component of a radio access network, such as by a relay base station (e.g., a relay eNodeB in an LTE network), in order to select a CoMP mode for its operations. Of course, it should be understood that method 400 or portions thereof may be implemented by other entities or combinations of entities, and/or may be implemented for other purposes, without departing from the scope of the invention.

As shown by block 401, method 400 involves a relay base station determining a load indication for a communication link between its relay WCD and its donor base station. (As discussed above, the relay base station is provided with a backhaul connection via the relay WCD and the donor base station.) At block 402, the relay base station uses the determined load indication for the communication interface between the relay WCD and the donor base station as a basis for selecting a CoMP mode from a plurality of available CoMP modes. The relay base station then provides wireless service in at least one coverage area according to the selected CoMP mode, as shown by block 403.

At block 401, the function of determining the load indication may simply involve the relay base station receiving a message that includes the load indication, and determining the load indication therefrom. In such embodiments, the relay WCD or another entity may initially determine a load indication for the communication link between the relay WCD and the donor base station. The relay WCD may then provide the load indication to the relay base station. Alternatively, block 401 could involve the relay base station more actively determining the load indication by, e.g., measuring air interface conditions on the link between itself and the relay WCD, for instance.

A relay WCD can convey a load indication to the relay base station in various ways. For example, the relay WCD could include the load indication in a system information block (SIB) message, such as a SIB3 or SIB5 message, for instance. Other techniques for conveying the load indication are also possible.

Further, various types of information could be included to indicate the loading on an air interface between the relay WCD and a donor base station. For example, the load indication could include a number of connected users, actual, predicted, or historical physical resource block (PRB) utilization percentage; and/or actual, predicted, or historical bandwidth information, among other possibilities. Further, in some embodiments, the load indication could include a-measure of latency on the communication link between the relay WCD and the donor base station.

Figure 4B:
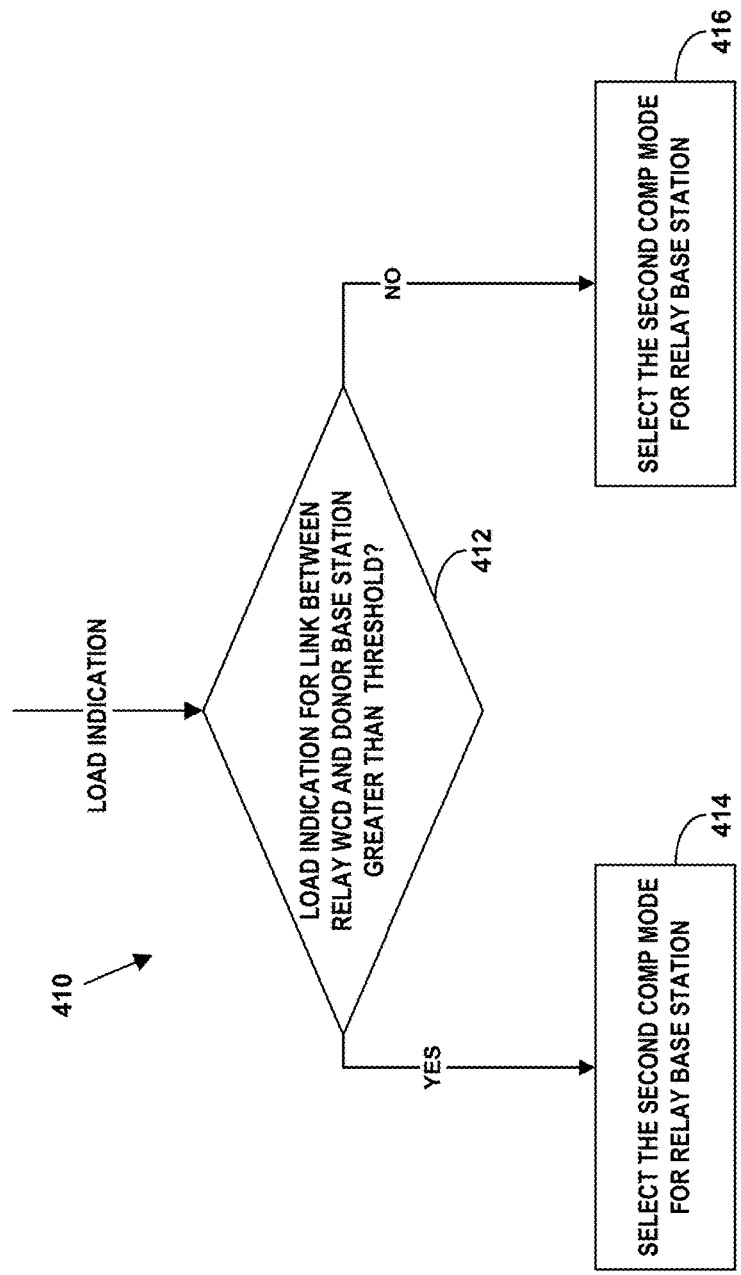
FIG. 4B is a flow chart illustrating a sub-method for selecting a coordinated multipoint mode, according to an exemplary embodiment.

At block 402, the relay base station may use various techniques to select a particular CoMP mode based on the load indication. For example, FIG. 4B is a flow chart illustrating a sub-method 410 for selecting a CoMP mode, according to an exemplary embodiment. Sub-method 410 may be implemented in embodiments where the available CoMP modes include at least a first CoMP mode and a second CoMP mode.

More specifically, as shown by block 412, the relay base station may determine whether or not the load indication is greater than a predetermined threshold (e.g., whether the load indication indicates that traffic is above some predetermined threshold level on the link between the relay WCD and the donor base station). Then, if it is determined that the load indication is greater than the predetermined threshold, the relay base station may select the second CoMP mode, as shown by block 414. Otherwise, if it is determined that the load indication is less than or equal to the threshold, then the relay base station may select the first CoMP mode, as shown by block 416.

In exemplary embodiments, when the load on the link between the relay WCD and the donor base station is higher, the relay base station will tend to select a CoMP mode that places less demand placed on the link between the relay WCD and the donor base station for backhaul communications. To illustrate, consider table 1 below, which shows three options for CoMP mode selection according to the method shown in FIG. 4B.

TABLE 1

| | CoMP Mode Selection | | |
| --- | --- | --- | --- |
| Load | Option 1 | Option 2 | Option 3 |
| Above threshold | Second Mode: decentralized joint processing | Second Mode: IRC-only | Second Mode: IRC-only |
| Below threshold | First Mode: centralized joint processing) | First Mode: centralized joint processing | Second Mode: decentralized joint processing |

According to Option 1, the relay base station selects a CoMP mode that utilizes centralized joint processing when the load indication is less than the threshold, and selects a CoMP mode that utilizes decentralized joint processing when the load indication is above the threshold. Since the use of centralized joint processing will typically reduce the demand placed on the link between the relay WCD and the donor base station for CoMP-related backhaul communications, as compared to when decentralized joint processing is used, implementation of sub-method 410 may help to manage the demand placed on the relay tunnel for backhaul communications when the traffic load on the relay tunnel (or a portion thereof) is high.

More specifically, centralized joint processing involves the relay base station sending raw I/Q data to a master base station (or, in the case where the relay base station is the master base station in a CoMP cluster, receiving raw I/Q data from other coordinating base station(s)), and thus places a greater demand on the relay tunnel than other CoMP modes such as those utilizing de-centralized join processing (or simply refraining from using CoMP altogether). As such, implementation of option 1 results in the relay base station using centralized joint processing only when the load indication is indicative of below-threshold loading on the link between the relay WCD and the donor base station.

Further, since decentralized joint processing involves coordinating base stations decoding and/or processing the received signal from a given UE, and then sending the decoded and/or processed signal (or information derived therefrom) to the master base station, de-centralized joint processing will typically place less demand on the relay tunnel for CoMP-related backhaul communications. Thus, according to option 1, the relay base station selects a CoMP mode utilizing decentralized joint processing when the load indication is indicative of above-threshold loading on the link between the relay WCD and the donor base station.

Options 2 and 3, shown in Table 1 above, also tend to reduce demand on the relay tunnel for CoMP-related backhaul communications when loading on the link between the relay WCD and donor base station is high. Specifically, according to Option 2, the relay base station selects an IRC-only CoMP mode, which typically places little to no additional demand on the backhaul link, when the load indication is greater than the threshold, and selects a CoMP mode that utilizes centralized joint processing when the load indication is below the threshold. And, according to Option 3, the relay base station selects an IRC-only CoMP mode when the load indication is greater than the threshold, and selects a CoMP mode that utilizes decentralized joint processing when the load indication is below the threshold. It should be understand that method 4B is not limited to the CoMP mode options shown in Table 1.

Figure 4C:
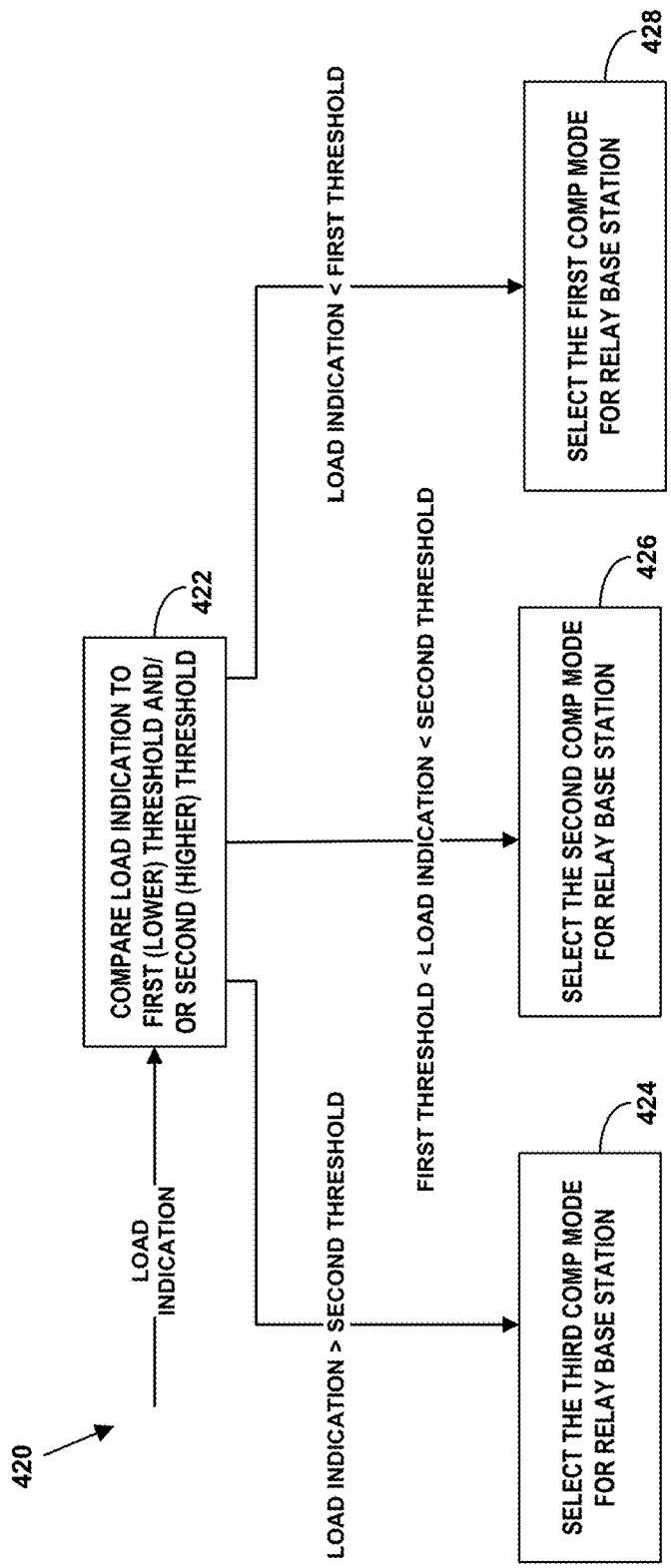
FIG. 4C is a flow chart illustrating another sub-method for selecting a coordinated multipoint mode, according to an exemplary embodiment.

Further, a relay base station may implement method 400 to select from more than two different CoMP modes. As one non-limiting example, consider FIG. 4C, which is a flow chart illustrating another sub-method 420 for selecting a CoMP mode for a relay base station, based on the load on the relay tunnel (e.g., on the link between the relay WCD and the donor base station). Sub-method 420 may be implemented at, e.g., block 402 of method 400, in embodiments where the available CoMP modes include at least a first CoMP mode, a second CoMP mode, and a third CoMP mode.

More specifically, two thresholds may be established for loading on the radio link between the relay WCD and the donor base station; a first lower threshold and a second higher threshold. As such, the relay base station may compare the load indication to one or both of the first and second thresholds, as shown by block 422. Note that the relay base station may compare the load indication to both the first and second threshold, before selecting a CoMP mode. Alternatively, the relay base station may initially compare the load indication to the first lower threshold, and only compare the load indication to the second higher threshold when the load indication is greater than the first lower threshold.

If the relay base station determines that the load indication is greater than the first predetermined threshold, then the relay base station selects the third CoMP mode, as shown by block 424. Alternatively, if the load indication is determined to be between the first predetermined threshold and the second predetermined threshold, or is equal to either the first predetermined threshold or the second predetermined threshold, then the relay base station selects the second CoMP mode, as shown by block 426. And, if the relay base station determines that the load indication is less than the second predetermined threshold, then the relay base station selects the first CoMP mode, as shown by block 428.

Table 2, below, shows one possible implementation of CoMP mode selection according to the method shown in FIG. 4B.

TABLE 2

| Load | CoMP Mode |
|---|---|
| High | Third Mode (IRC-only) |
| Medium | Second Mode (decentralized joint processing) |
| Low | First Mode (centralized joint processing) |

In implementation of method 420 described by Table 2, a CoMP scheme utilizing centralized joint processing may be selected when the load on the link between the relay WCD and the donor base station is "low" (e.g., less than the lower threshold), a CoMP scheme utilizing decentralized joint processing may be selected when the load on the link between the relay WCD and the donor base station is "medium" (e.g., greater than the lower threshold, but less than the higher threshold), and IRC-only CoMP scheme may be selected when the load on the link between the relay WCD and the donor base station is "high" (e.g., greater than both the lower threshold and the higher threshold). Alternatively, when the load is "high", the relay base station may simply disable CoMP altogether.

In a further aspect, when a WCD is being provided with uplink CoMP service and its master base station is not the relay base station, the service provided according to block 406 of method 400 may vary according to the CoMP mode that its master base station is utilizing. In particular, when a given WCD is being served by other base stations using an uplink CoMP that places greater demands on backhaul resources than the CoMP mode selected by the relay base station at block 404, the relay base station may simply refrain from participating in uplink CoMP for the given WCD. Importantly, in this scenario, the relay base station may refrain from participating in uplink CoMP for the given WCD, even if it could participate as a coordinating base station under the selected CoMP mode.

As a non-limiting example, consider the scenario where a given WCD is within the coverage area of a relay base station, but is being provided with uplink CoMP using centralized joint processing by two or more other base stations, one of which is acting as a master base station for the WCD. Further, in this example scenario, the relay base station has selected decentralized joint processing at block 402 of method 400, due to significant loading on the link between its relay WCD and donor base station. Since the WCD is being provided with uplink CoMP service using centralized joint processing by other base stations, the relay base station may simply refrain from participating in uplink CoMP service for the WCD. Other examples are also possible.

Figure 5:
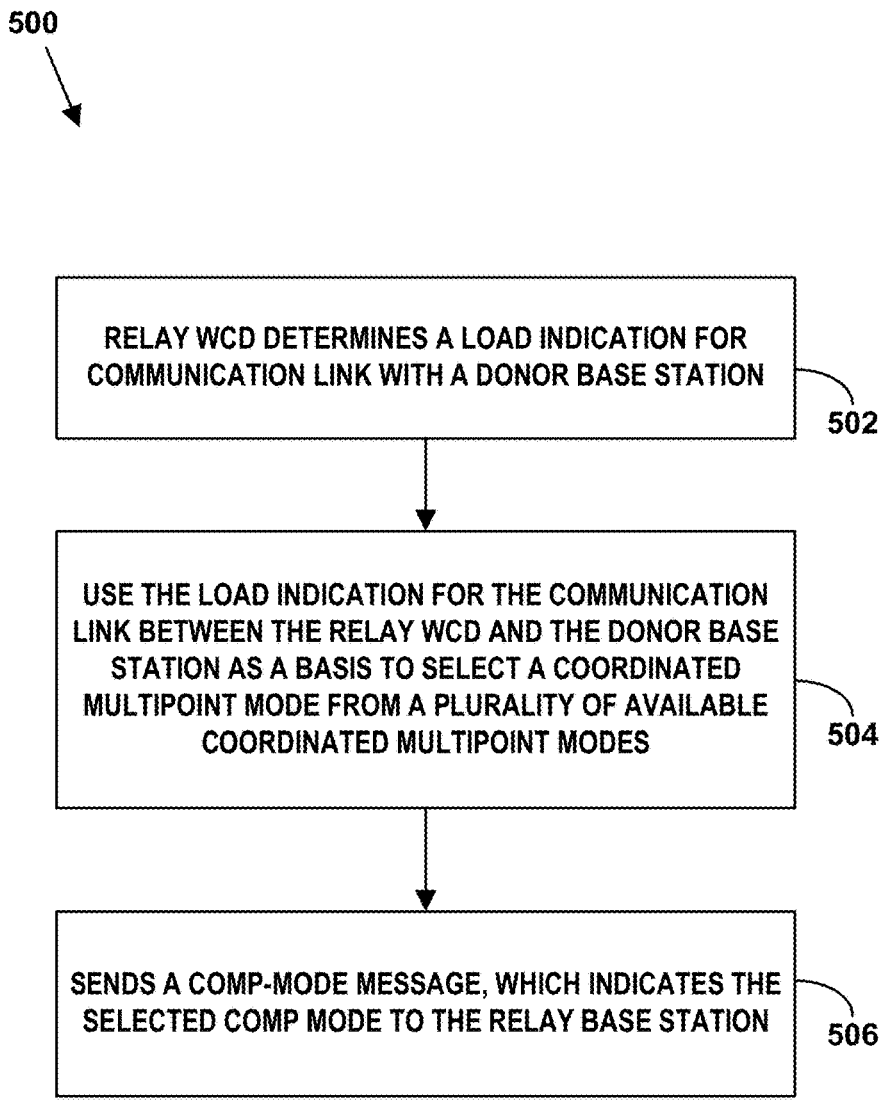
FIG. 5 is flow chart illustrating another method, according to an exemplary embodiment.

In a further aspect, a WCD serving as a relay WCD for a relay base station, may be able to select the CoMP mode that should be utilized by the relay base station, or set limits on the CoMP modes that can be used by the relay base station. In such embodiments, selection of the CoMP mode may be carried out by the relay WCD, instead of by the relay base station. FIG. 5 is a flow chart illustrating a method 500 for selection of a CoMP mode for a relay base station, which can be implemented by the relay WCD that serves the relay base station.

In particular, block 502 of method 500 involves the relay WCD determining a load indication for a communication link between the relay WCD and a donor base station. The relay WCD then uses the load indication for the communication link between the relay WCD and the donor base station as a basis for selecting a CoMP mode from a plurality of available CoMP modes, as shown by block 504. The selection may be implemented by the relay WCD in a similar manner as described above in reference to selection by the relay base station.

The relay WCD then sends a CoMP-mode message indicating the selected CoMP mode to the relay base station, as shown by block 506. Note that the CoMP-mode message may serve as an instruction to the relay base station to provide wireless service according to the selected CoMP mode. Alternatively, the CoMP-mode message may serve as an indication to limit CoMP service to the selected CoMP mode and other CoMP modes that place the same or less demand on backhaul resources than the selected CoMP mode. In other words, the selected CoMP mode may serve as an instruction to the relay base station to refrain from using any CoMP mode that places a greater demand on backhaul resources than the selected CoMP mode.

V. CONCLUSION

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

We claim:

1. A method comprising:
    determining, by a relay base station, a load indication for a communication link between a relay wireless communication device (WCD) and a donor base station, wherein the relay base station is provided with a backhaul connection via the relay WCD and the donor base station;
    using, by the relay base station, the load indication for the communication link between the relay WCD and the donor base station as a basis for selecting a coordinated multipoint (CoMP) mode from a plurality of available CoMP modes; and
    providing, by the relay base station, wireless service in at least one coverage area according to the selected CoMP mode;
    wherein the plurality of CoMP modes comprises at least a first CoMP mode and a second CoMP mode, wherein wireless service according to the first CoMP mode comprises centralized joint processing, wherein wireless service according to the second CoMP mode comprises decentralized joint processing, and wherein selecting the CoMP mode from the plurality of CoMP modes comprises:
        determining whether or not the load indication is greater than a predetermined threshold;
        if it is determined that the load indication is greater than the predetermined threshold, then selecting the second CoMP mode; and
        if it is determined that load indication is less than or equal to the threshold, then selecting the first CoMP mode, wherein the first CoMP mode corresponds to a greater level of backhaul communications via the communication link between the relay WCD and the donor base station, as compared to second CoMP mode.

2. The method of claim 1, wherein the donor base station comprises an eNodeB in a Long Term Evolution (LTE) network.

3. The method of claim 1, wherein determining the load indication comprises the relay base station receiving a load-indication message that includes an indication of load on the communication link between the relay WCD and the donor base station.

4. The method of claim 1, wherein determining the load indication for the communication link between the relay WCD and the donor base station further comprises determining a measure of traffic level on a relay link between the relay WCD and the donor base station.

5. The method of claim 1, wherein determining the load indication for the communication link between the relay WCD and the donor base station further comprises determining a measure of traffic level in a sector in which the relay WCD is attached to the donor base station.

6. The method of claim 3, wherein selecting the CoMP mode from the plurality of CoMP modes comprises selecting an uplink CoMP mode from a plurality of uplink CoMP modes.

7. The method of claim 1, wherein selecting the CoMP mode from the plurality of CoMP modes comprises:
if the load indication is greater than a predetermined threshold, then disabling CoMP for wireless service provided by the relay base station; and
otherwise, if the load indication is less than or equal to the predetermined threshold, then enabling CoMP for wireless service provided by the relay base station.

8. A method comprising:
determining, by a relay base station, a load indication for a communication link between a relay wireless communication device (WCD) and a donor base station, wherein the relay base station is provided with a backhaul connection via the relay WCD and the donor base station;
using, by the relay base station, the load indication for the communication link between the relay WCD and the donor base station as a basis for selecting a coordinated multipoint (CoMP) mode from a plurality of available CoMP modes; and
providing, by the relay base station, wireless service in at least one coverage area according to the selected CoMP mode;
wherein the plurality of CoMP modes comprises at least a first CoMP mode, a second CoMP mode, and a third CoMP mode, and wherein selecting the CoMP mode from the plurality of CoMP modes comprises:
comparing the load indication to a first predetermined g comprising: threshold or a second predetermined threshold, or both, wherein the first predetermined threshold is less than the second predetermined threshold;
if it is determined that the load indication is less than the first predetermined threshold, then selecting the first CoMP mode;
if it is determined that load indication is between the first predetermined threshold and the second predetermined threshold, or is equal to either the first predetermined threshold or the second predetermined threshold, then selecting the second CoMP mode; and
if it is determined that the load indication is greater than the second predetermined threshold, then selecting the third CoMP mode.

9. The method of claim 8, wherein the first CoMP mode comprises centralized joint processing, wherein the second CoMP mode comprises decentralized joint processing, and wherein the third CoMP mode comprises interference rejection combining.

10. A base-station system comprising:
a communication interface operable for wireless communication with a wireless communication device (WCD);
an antenna operable to provide wireless service in at least one coverage area;
at least one processor; and
program instructions stored on a non-transitory computer readable medium and executable by the at least one processor to perform functions comprising:
(a) causing a base station to operate as a relay base station via a connection to the WCD and a donor base station serving the WCD, wherein the WCD serves as a relay WCD for the relay base station;
(b) determining a load indication for a communication link between the relay WCD and the donor base station, wherein the relay base station is provided with a backhaul connection via the relay WCD and the donor base station, wherein the load indication comprises a measure of latency on the communication link between the relay WCD and the donor base station;
(c) using the load indication for the communication link between the relay WCD and the donor base station as a basis for selecting a coordinated multipoint (CoMP) mode from a plurality of available CoMP modes; and
(d) providing wireless service in at least one coverage area according to the selected CoMP mode;
wherein the plurality of CoMP modes comprises at least a first CoMP mode and a second CoMP mode, wherein wireless service according to the first CoMP mode comprises centralized joint processing, wherein wireless service according to the second CoMP mode comprises decentralized joint processing, and wherein selecting the CoMP mode from the plurality of CoMP modes comprises:
determining whether or not the load indication is greater than a predetermined threshold;
if it is determined that the load indication is greater than the predetermined threshold, then selecting the second CoMP mode; and
if it is determined that load indication is less than or equal to the threshold, then selecting the first CoMP mode, wherein the first CoMP mode corresponds to a greater level of backhaul communications via the communication link between the relay WCD and the donor base station, as compared to second CoMP mode.

11. The base-station system of claim 10, wherein the base-station system is implemented as part of, or takes the form of, an eNodeB in a Long Term Evolution (LTE) network.

12. The base-station system of claim 10, wherein selecting the CoMP mode from the plurality of CoMP modes comprises selecting an uplink CoMP mode from a plurality of uplink CoMP modes.

13. A base-station system comprising:
a communication interface operable for wireless communication with a wireless communication device (WCD);

an antenna operable to provide wireless service in at least one coverage area;

at least one processor; and program instructions stored on a non-transitory computer readable medium and executable by the at least one processor to perform functions comprising:

(a) causing a base station to operate as a relay base station via a connection to the WCD and a donor base station serving the WCD, wherein the WCD serves as a relay WCD for the relay base station;

(b) determining a load indication for a communication link between the relay WCD and the donor base station, wherein the relay base station is provided with a backhaul connection via the relay WCD and the donor base station, wherein the load indication comprises a measure of latency on the communication link between the relay WCD and the donor base station;

(c) using the load indication for the communication link between the relay WCD and the donor base station as a basis for selecting a coordinated multipoint (CoMP) mode from a plurality of available CoMP modes; and (d) providing wireless service in at least one coverage area according to the selected CoMP mode:

wherein the plurality of CoMP modes comprises at least a first CoMP mode, a second CoMP mode, and a third CoMP mode, and wherein selecting the CoMP mode from the plurality of CoMP modes comprises:

comparing the load indication to a first predetermined threshold or a second predetermined threshold, or both, wherein the first predetermined threshold is less than the second predetermined threshold;

if it is determined that the load indication is less than the first predetermined threshold, then selecting the first CoMP mode;

if it is determined that load indication is between the first predetermined threshold and the second predetermined threshold, or is equal to either the first predetermined threshold or the second predetermined threshold, then selecting the second CoMP mode; and if it is determined that the load indication is greater than the second predetermined threshold, then selecting the third CoMP mode.

14. The base-station system of claim 13, wherein the first CoMP mode comprises centralized joint processing, wherein the second CoMP mode comprises decentralized joint processing, and wherein the third CoMP mode comprises interference rejection combining.

15. A method comprising:

determining, by a relay wireless communication device (WCD), a load indication for a communication link between the relay WCD and a donor base station, wherein a relay base station is provided with a backhaul connection via the relay WCD and the donor base station;

using, by the relay WCD, the load indication for the communication link between the relay WCD and the donor base station as a basis for selecting a coordinated multipoint (CoMP) mode from a plurality of available CoMP modes, wherein the load indication comprises a measure of latency on the communication link between the relay WCD and the donor base station; and sending, by the relay WCD, a CoMP-mode message that indicates the selected CoMP mode to the relay base station;

wherein the plurality of CoMP modes comprises at least a first CoMP mode and a second CoMP mode, wherein wireless service according to the first CoMP mode comprises centralized joint processing, wherein wireless service according to the second CoMP mode comprises decentralized joint processing, and wherein selecting the CoMP mode from the plurality of CoMP modes comprises:

determining whether or not the load indication is greater than a predetermined threshold;

if it is determined that the load indication is greater than the predetermined threshold, then selecting the second CoMP mode; and if it is determined that load indication is less than or equal to the threshold, then selecting the first CoMP mode, wherein the first CoMP mode corresponds to a greater level of backhaul communications via the communication link between the relay WCD and the donor base station, as compared to second CoMP mode.

16. The method of claim 15, further comprising:

providing, by the relay WCD, a relay base station with a backhaul connection via the relay WCD and the donor base station.

17. The method of claim 1, wherein the load indication comprises a measure of latency on the communication link between the relay WCD and the donor base station.

* * * * *